United States Patent
Velarde et al.

(10) Patent No.: US 7,634,067 B1
(45) Date of Patent: Dec. 15, 2009

(54) METHODS AND SYSTEMS FOR VISUAL VOICE CALLS

(75) Inventors: Jimena Velarde, Boston, MA (US);
Edwin Elberg, Woburn, MA (US); Luis Blando, Woburn, MA (US); John Valdez, Flower Mound, TX (US);
Michael J. Naggar, Frisco, TX (US);
Mona A. Goldstein, Corinth, TX (US);
Sudhanshu Sharma, Malden, MA (US);
Raul Aldrey, Dallas, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 897 days.

(21) Appl. No.: 11/303,980

(22) Filed: Dec. 19, 2005

Related U.S. Application Data

(60) Provisional application No. 60/636,992, filed on Dec. 17, 2004.

(51) Int. Cl.
*H04M 1/64* (2006.01)

(52) U.S. Cl. .................................. 379/88.17; 370/463
(58) Field of Classification Search ............. 379/88.17, 379/88.13; 370/463
See application file for complete search history.

(56) References Cited

U.S. PATENT DOCUMENTS

| | | | |
|---|---|---|---|
| 6,462,756 B1 * | 10/2002 | Hansen et al. | 715/764 |
| 7,035,620 B2 * | 4/2006 | Ben-Efraim et al. | 455/412.1 |
| 2002/0015402 A1 * | 2/2002 | Hughes et al. | 370/347 |
| 2004/0239681 A1 * | 12/2004 | Robotham et al. | 345/581 |

* cited by examiner

*Primary Examiner*—Creighton Smith

(57) ABSTRACT

In an exemplary method, at least one telephony attribute associated with a voice call directed from a client communication subsystem to a voice network identifier is detected. Visual content that has been predefined as being associated with the at least one telephony attribute is identified. A request for the visual content is initiated in response to the detecting step. The visual content is received, in response to the initiating step, for display at the client communication subsystem.

24 Claims, 7 Drawing Sheets

METHODS AND SYSTEMS FOR VISUAL VOICE CALLS

RELATED APPLICATION

The present application claims priority under 35 U.S.C. §119(e) to U.S. Provisional Patent Application Ser. No. 60/636,992, by Jimena Velarde et al., filed on Dec. 17, 2004, and entitled VISUAL TELEPHONE CALLS, the contents of which are hereby incorporated by reference in their entirety.

BACKGROUND INFORMATION

Providers of products and services generally seek to provide consumers with convenient and helpful ways to receive information about, to purchase, and to use the products and services. One well-known technique for distributing information and services to consumers is by employing human operators (e.g., customer service representatives) to communicate with the consumers by telephone. More recently, automated telephone applications have been introduced to provide information and services to consumers. For example, many organizations use telephone applications capable of automatically playing back audio recordings (e.g., menu choices) to callers. Other automated telephone applications have more complex functionality, including Interactive Voice Response ("IVR") and touchtone recognition technologies. For example, many banking organizations provide customers with IVR and/or touchtone telephone access to automated banking services, which are commonly referred to as "touchtone teller" services.

Other existing telephone applications combine human operators with automated telephone applications. For example, many customer service applications are able to automatically recognize telephony signals (e.g., caller ID signals) and present information associated with the telephony signals to a customer service representative. Accordingly, a customer service representative can be prepared with information helpful for communicating with a caller, including the identification, account number, or other information associated with the caller.

However, existing telephone applications are generally limited to supporting only voice and touchtone telephony communications. For example, existing telephone applications are unable to present visual information to persons calling a customer service representative, and communications between callers and the customer service representative are typically limited to voice communications. Consequently, providers of information and services are restricted with respect to the type, format, and amount of information that can be conveniently presented to callers. For example, audio presentation of large amounts of information can be time consuming, and many callers tend to perceive lengthy voice messages to be burdensome. In particular, many existing telephone applications use prerecorded voice instructions (i.e., an automated operator) to guide callers through a series of menu choices. The automated operator audibly recites the menu choices to callers and recognizes caller selections, which are typically received in the form of voice or touchtone signals. Unfortunately, this process is often time consuming and frustrating for callers, especially when a significant number of menu choices is audibly recited. A caller may be forced to wait a substantial amount of time to listen to an audible recitation of multiple menu options before the option desired by the caller is finally recited.

These and other limitations of conventional automated telephone applications can easily frustrate callers to the point that customer satisfaction is compromised. Moreover, lengthy call times can preclude would-be callers from being able to access a telephone application. Patronage may even be lost because of delays and inconveniences associated with conventional telephone applications.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Preferred embodiments according to the present invention may be implemented as systems and methods for visual voice calls. Providers of information and services (referred to herein as "content providers") can use the present systems and methods to manage visual content, including building visual content and associating one or more telephony identifiers (e.g., voice network identifiers such as telephone numbers) and/or events with the visual content. A content management subsystem provides content providers with tools for managing visual content. The tools allow content providers to conveniently provide customized visual content and to define telephony identifiers and events, the occurrence of which will cause the visual content to be presented for consideration by users of voice communication services. Accordingly, display of visual content can be synchronized with telephony signals in accordance with associated defined by content providers.

For example, a user of a voice communication device (e.g., a telephone having display capabilities) may initiate a voice call over a voice communication network to a target voice network identifier (e.g., a telephone number), which has been predefined as being associated with visual content. The present systems and methods can recognize the occurrence of telephony signals representative of the target telephone number, identify the visual content predefined as being associated with the target telephone number, and push the associated visual content to the voice communication device from which the voice call is being initiated. In this manner, the user of the voice communication device can be presented with visual content upon initiation of a voice call directed to a target telephone number associated with the visual content.

Because the user of the voice communication device can process the visual content at her own speed, the user no longer has to wait for a human or automated telephone operator to audibly recite menu options or other information before making a selection. Accordingly, the presentation of visual content to users of voice communication services generally enhances the convenience of accessing information and services through voice communication services. In addition, the present systems and methods provide content providers with substantial control over visual content, as well as the presentation of the visual content.

II. Exemplary System

Figure 1:
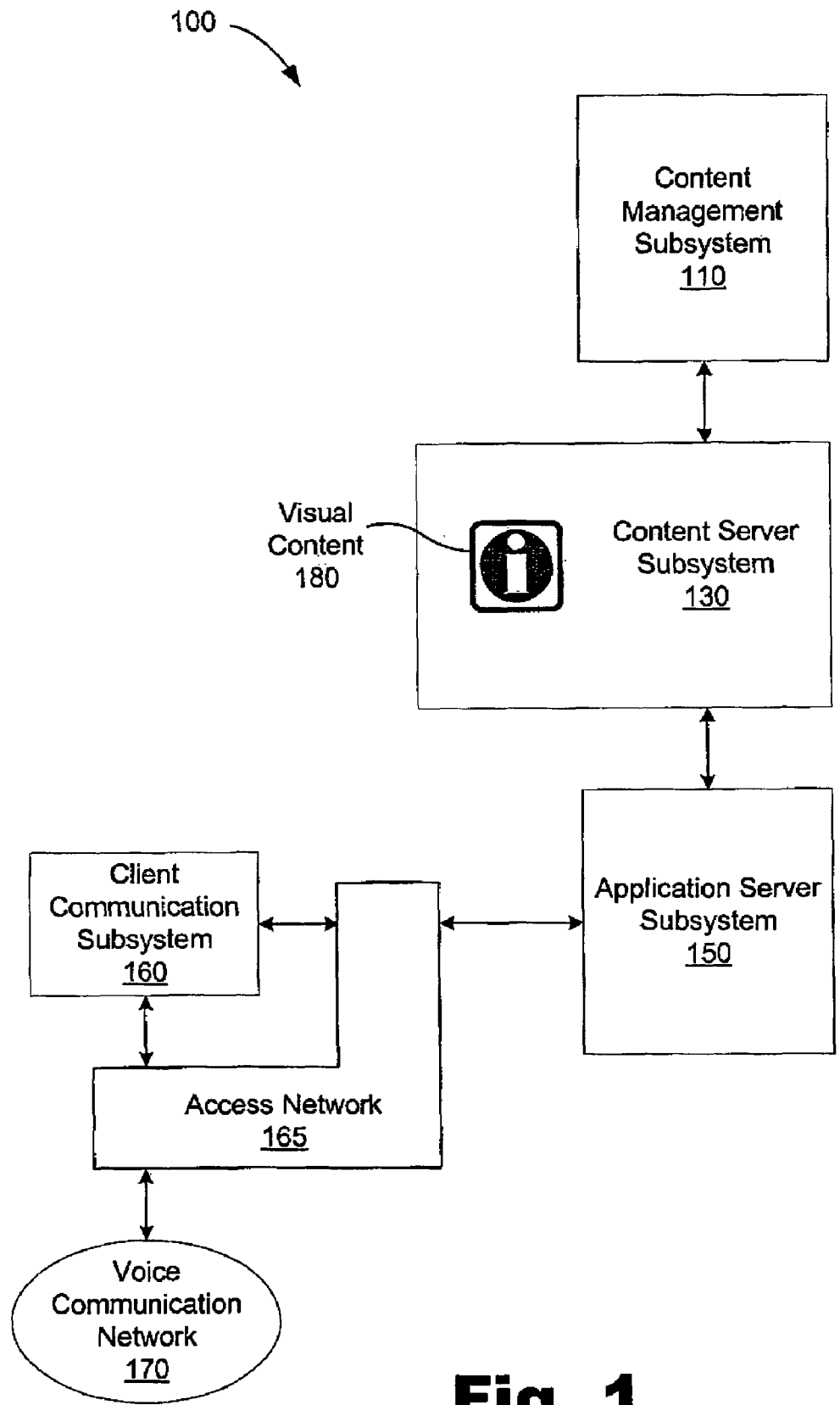
FIG. 1 is a block diagram illustrating an exemplary visual voice call system, according to an embodiment.

Turning now to the figures, FIG. 1 is a block diagram of an exemplary visual voice call system 100 (or simply "system 100"), according to an embodiment. As shown in FIG. 1, system 100 may include content management subsystem 110, content server subsystem 130, application server subsystem 150, and client communication subsystem 160 communicatively coupled to one another as represented by the arrowed lines shown in the Figure. Client communication subsystem 160 may be configured to send and receive voice communications (e.g., voice calls) over voice communication network 170, as shown in FIG. 1. Visual content 180 may be deployed at content server subsystem 130 for delivery to and display at client communication subsystem 160. Examples of visual content 180 will be described further below.

Any suitable communications technologies may be used to establish and carry communications between the communicatively coupled elements of FIG. 1. For example, communication networks and associated interfaces may be used to communicatively connect the elements. Suitable communication networks may include, but are not limited to, packet-switched networks (e.g., intranets, the Internet, etc.), circuit-switched networks (e.g., the Public-Switched Telephone Network ("PSTN"), mobile telephone networks, etc.), or any combination of packet-switched and circuit-switched networks. For example, one or more access networks 165 may be used to provide communications services to client communications subsystem 160, where such access networks 165 may include one or more wired or wireless communications technologies.

Further, any suitable communication formats and protocols may be used for communications between the elements of FIG. 1. Suitable communication formats and protocols may include, but are not limited to Hypertext Transfer Protocol ("HTTP"), Hypertext Markup Language ("HTML"), extensible markup language ("XML"), extensible stylesheet language transformation ("XLST"), and known voice communication service formats and protocols. Accordingly, one or more functions of content management subsystem 110, content server subsystem 130, and/or application server subsystem 150 may be implemented as web services accessible over the Internet. Thus, content management subsystem 110, content server subsystem 130, and application server subsystem 150 may include or be implemented on one or more servers (e.g., web and application servers).

The elements shown in FIG. 1 may be implemented as software, hardware, firmware, or combinations thereof. Accordingly, certain elements of system 100 may include software and/or firmware modules configured to be executed on one or more computing devices. Thus, system 100 may be implemented on more than one physical computing device, which may include any computing devices known to those skilled in the art, and may employ any of a number of computer operating systems known to those skilled in the art, including, but by no means limited to, known versions and/or varieties of the Microsoft Windows® operating system, the Unix operating system, the Linux operating system, and other known suitable operating systems.

Accordingly, those skilled in the art will recognize that the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computing device (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, those skilled in the art will recognize that the configuration of the exemplary elements illustrated in the Figure is not intended to be limiting. Indeed, those skilled in the art will recognize that other alternative hardware environments and implementations may be used. For example, while FIG. 1 illustrates a single client communication subsystem 160, this is for convenience only and not intended to be limiting Indeed, in many embodiments, one or more client communication subsystems 160 may be in communication with application server subsystem 150. The elements shown in FIG. 1 will now be described in detail, including exemplary embodiments of content server subsystem 130, application server subsystem 150, and client communication subsystem 160.

A. Content Management Subsystem

Content management subsystem 110 may include one or more computing devices (e.g., servers and/or client devices) and computer-readable instructions (e.g., software) configured to be executed on the device(s). In certain embodiments, content management subsystem 110 includes one or more servers (e.g., web servers and application servers) configured to make content management tools available to content providers through one or more communication networks. For example, content management subsystem 110 may make web services for managing content available to a user via the Internet. Content management subsystem 110 may include one or more interfaces through which content providers can access the content management tools. Accordingly, a content provider may use any suitable computing device(s) and application(s) (e.g., a web browser) (not shown in FIG. 1) to access the tools provided by content management subsystem 110.

Suitable devices for accessing content management subsystem 110 may include, but are not limited to, one or more desktop computers, laptop computers, tablet computers, handheld devices, personal data assistants, mobile telephones (e.g. cellular telephones), IP-enabled devices, satellite pagers, wireless internet devices, embedded computers, mainframe computers, mini-computers, workstations, network interface cards, programmable logic devices, entertainment devices, gaming devices, and any other device capable of communicating with content management subsystem 110. The client devices may include various peripherals such as a terminal, keyboard, mouse, screen, printer, stylus, input device, output device, microphone, speaker, sound card, or any other apparatus or interface that can help relay information between a user and content management subsystem 110.

In alternative embodiments, content management subsystem 110 may include computer-readable instructions (e.g, one or more software applications) implemented and configured to be operated on one or more computing devices, including any of devices listed above. In such embodiments, content management subsystem 110 may be configured to communicate with content server subsystem 130 via the Internet or other suitable communication network(s).

Tools provided by content management subsystem 110 for managing visual content 180 may include, but are not limited to, tools for creating, uploading, modifying, organizing, deleting, tracking, and otherwise managing visual content 180. With access to the tools, content providers are able to conveniently customize visual content 180.

Upon a user accessing content management subsystem 110, a login template may be presented to the user. Content management subsystem 110 may utilize any known login technology or technologies, including single sign-on ("SSO") technologies, which are well known to those skilled in the art.

Once the content provider successfully logs in to content management subsystem 110, the content provider has access to tools for building and uploading visual content 180. For example, content management subsystem 110 may include libraries of images that can be used to build visual content 180. Content providers are able to query and/or browse image libraries to identify and select images to be used to create visual content 180. Content management subsystem 110 may be configured to allow content providers to upload images into the image libraries.

Image libraries may be specific to content providers. For example, a particular content provider may build and have access to a particular library of images. If the particular content provider is in the food services industry, for example, the content provider may create a library of images that includes visual images of menus, daily specials, and products offered by the content provider. Another particular content provider may build and use a different library of images. For example, a content provider in the banking industry may use content management subsystem 110 to build a library of images related to the banking services offered by the content provider.

Through content management subsystem 110, content providers are able to associate telephony identifiers and/or events (collectively "telephony attributes" or "voice communication attributes") with visual content 180. Examples of telephony attributes include, but are not limited to, voice network identifiers such as telephone numbers, portions of voice network identifiers such as area codes, country codes, and telephone number prefixes), initiation of a voice call, connection of a voice call, disconnection of a voice call, termination of a voice call, detection of predetermined telephony signals (e.g., Public-Switched Telephone Network ("PSTN"), Voice over Internet Protocol ("VoIP"), Interactive Voice Response ("IVR"), Dual Tone Multi-Frequency ("DTMF"), or other telephony signals), including telephony signals indicative of input from a call participant (e.g., data representative of an IVR or touchtone signal), or any other event or identifier capable of being represented by telephony signals. Telephony attributes may also include any information associated with subscribers to voice communication services (e.g., telephone numbers), including, but not limited to, geographic location identifiers, street addresses, zip codes, postal codes, country codes, area codes, and account identifiers associated with the subscribers.

A detection of an occurrence of telephony signals representative of a telephony attribute may trigger delivery of visual content 180 that has been predefined as being associated with the telephony attribute. Accordingly, delivery of specific instances of visual content 180 can be synchronized with telephony signals (e.g., voice signals associated with voice calls) in accordance with predefined associations provided by content providers. In certain embodiments, information (e.g., a zip code or area code) associated with a voice services subscriber may also be used to help select the instances of visual content 180 to be delivered for display. Delivery of visual content 180 will be described in detail further below.

Through content management subsystem 110, content providers are able to track the status of visual content 180. For example, content management subsystem 110 may be configured to determine the status of visual content 180 stored in system 100. The status may indicate whether visual content 180 has been deployed on content server subsystem 130 (i.e., visual content 180 is ready for delivery), edited, or deleted. Content management subsystem 110 may be further configured to indicate the times at which visual content 180 has been created, modified, uploaded, deleted, and deployed for delivery. Content server subsystem 130 may indicate when visual content 180 is unavailable for delivery (e.g., visual content 180 is being edited by a content provider) Content management subsystem 110 may be configured to track and report the number of times visual content 180 has been delivered.

Content management subsystem 100 may be further configured to indicate whether visual content 180 is pending approval or has been approved or rejected. An exemplary approval process will be described further below.

Content management subsystem 110 may provide any other functions potentially useful for managing visual content 180. In certain embodiments, for example, content management subsystem 110 provides content providers with a capability for previewing visual content 180 before or while the content is deployed on content server subsystem 130.

Content management tools provided by content management subsystem 110 may include predefined templates. In certain embodiments, the predefined templates are in the form of HTML templates (e.g., web forms). Content providers are able to use the predefined templates to perform content management functions.

Figure 2:
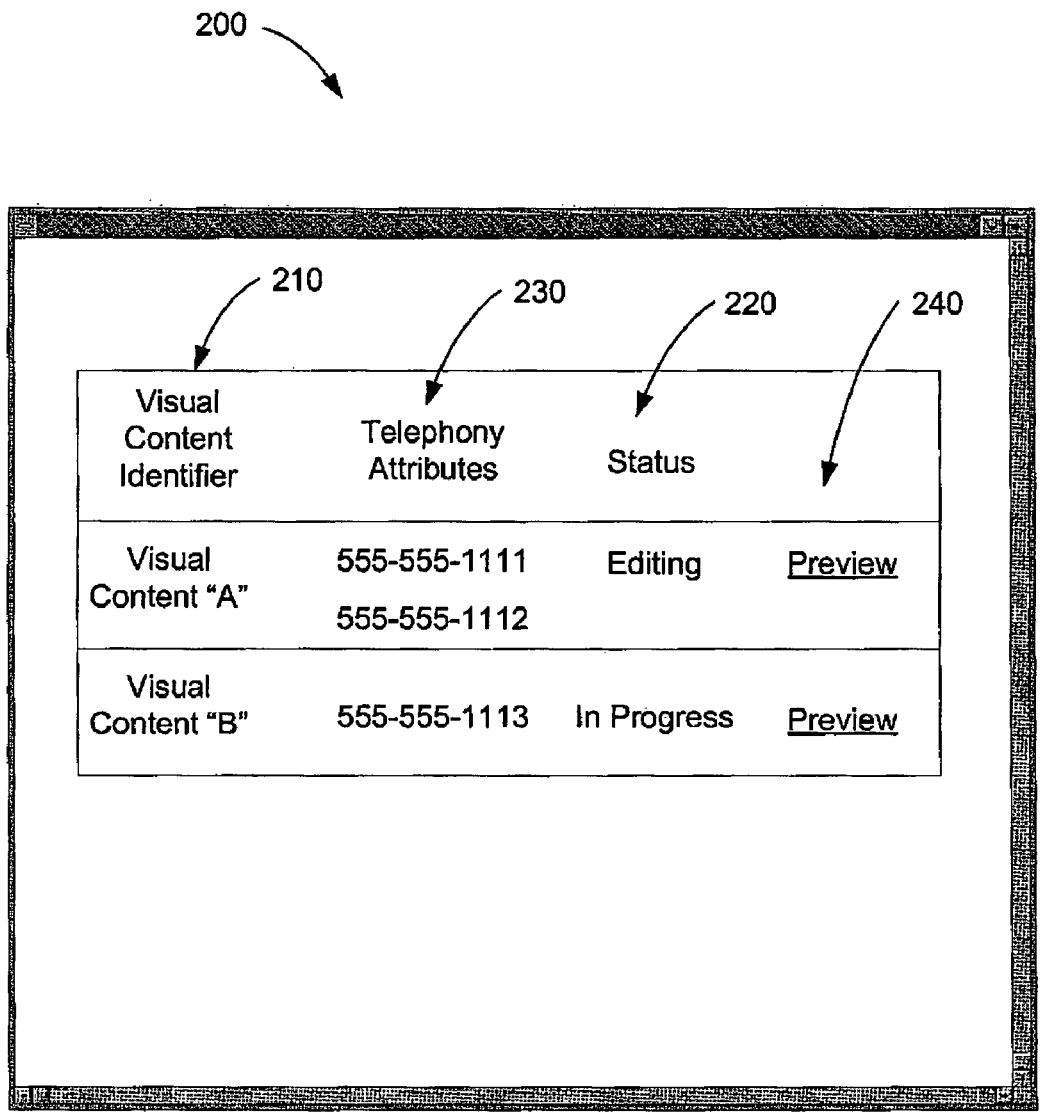
FIG. 2 is a block diagram illustrating an exemplary template for managing visual content, according to an embodiment.

FIG. 2 is a block diagram illustrating an exemplary template 200 for managing visual content 180. As shown in FIG. 2, template 200 includes a list 210 of visual content identifiers. Typically, the visual content identifier list 210 comprises names assigned to instances of visual content 180. In certain embodiments, the visual content identifiers are in the form of web site addresses. Template 200 may provide functionality for defining, modifying, and deleting associations between visual content identifiers and telephony attributes.

Content providers can use template 200 to select, track, and preview instances of visual content 180. In particular, template 200 may include a status list 220 and a telephony attribute list 230. Template 200 may provide, for each of the listed visual content identifiers, an associated status and one or more associated telephony attributes. In FIG. 2, the illustrated telephony attributes are in the form of telephone numbers, "Preview" links 240 are also provided, the selection of which will cause the associated visual content 180 to be presented for viewing.

Content management subsystem 110 may be configured to provide different levels of management functions to content providers. Accordingly, content subscribers may select from different subscription classes. Examples of subscription classes may include static, dynamic, and interactive, which may correspond with the class of visual content 180 that content providers are allowed to submit. Certain content providers may elect to provide only static visual content 180, while other content providers may elect to dynamically share visual content 180. Other content providers may elect to provide interactive visual content 180 that allows voice call participants to use visual content 180 to provide interactive input to system 100. Examples of static and interactive classes of visual content 180 will be described further below.

Specific predefined templates may be provided for each subscription class. For example, content management subsystem 100 may provide a first set of content management templates to content providers in a first class and a second set of content management templates to content providers in a second class.

Content management subsystem 110 may include one or more data stores (not shown) for storing data, including data representative of visual content 180, telephony attributes, information associated with content providers, content statuses, image libraries, and any other data useful for providing content providers with tools for managing visual content 180. Any suitable data storage technology may be used to store the data.

Content management subsystem 110 may provide tools for submitting visual content 180 to content server subsystem 130. For example, once a content provider has built an instance of visual content 180, the content provider may instruct content management subsystem 110 to submit visual content 180 to content server subsystem 130. Content management subsystem 110 then provides visual content 180 to content server subsystem 130, which is able to host visual content 180 for delivery to client communication subsystem 160. In certain embodiments, visual content 180 is transmitted between content management subsystem 110 and content server subsystem 130 using XML/XSLT format, which will be understood by those skilled in the art.

B. Content Server Subsystem

Content server subsystem 130 may include one or more computing devices (e.g., servers) and computer-readable instructions configured to be executed by the computing devices. Content server subsystem 130 may be configured to receive, store, and deploy visual content 180. Content server subsystem 130 may also be configured to subject received visual content 180 to an approval process prior to deployment.

Figure 3:
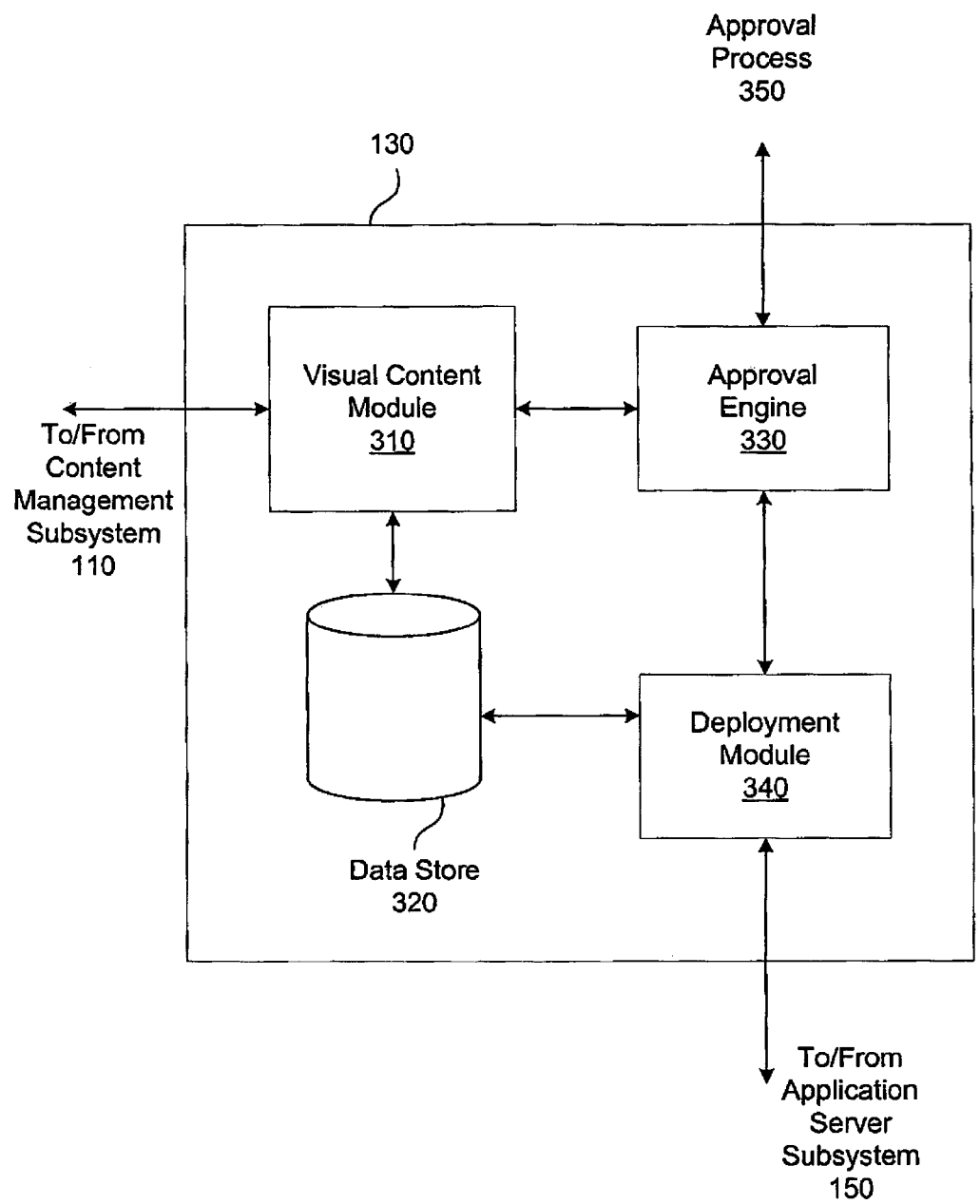
FIG. 3 is a block diagram illustrating a particular embodiment of the content server subsystem of FIG. 1.

FIG. 3 is a block diagram illustrating an exemplary embodiment of content server subsystem 130. As shown in FIG. 3, content server subsystem 130 may include visual content module 310, data store 320, approval engine 330, and delivery module 340 communicatively coupled to one another as shown. Any suitable communication technology or technologies may be employed to communicatively couple the elements of content server subsystem 130.

Visual content module 310 may be configured to receive visual content 180 from content management subsystem 110. Visual content 180 may be stored at visual content module 310. In certain embodiments, visual content module 310 includes third-party server farms such as those provided by Vignette Corporation of Austin, Tex.

Visual content module 310 may be configured to propagate content management commands received from content management subsystem 110 through to visual content 180 stored at content server subsystem 130. Visual content module 310 may also be configured to ascertain the status of visual content 180 stored at content server subsystem 130 and to make the status available to content providers through content management subsystem 110, thereby allowing content providers to use content management subsystem 110 to track the status of visual content 180, as described above.

Visual content module 310 may be configured to forward received visual content 180 to approval engine 330, which can subject the visual content to an approval process 350. Approval process 350 may include either or both manual and automated approval process steps, including any approval process steps known to those skilled in the art In certain embodiments, approval engine 330 includes a workflow application configured to notify predetermined persons of the submission of visual content 180 to approval engine 330. This may be done in any suitable manner, including sending approval process messages (e.g., e-mail messages) to the predetermined persons who may have responsibility for reviewing and approving or rejecting submitted visual content 180. The predetermined persons may send their responses to approval engine 330. The responses may be in any suitable form, including e-mail messages. Any suitable workflow application may be used to submit visual content 180 to an approval process, including any workflow applications known in the art.

From the response messages, approval engine 330 can determine whether visual content 180 has been approved or rejected. Approval engine 330 may be configured to notify visual content module 310 as to whether visual content 180 has been approved or rejected. Visual content module 310 can then initiate communication of one or more status messages to the content provider who submitted visual content 180. The status messages may include notification of the status of visual content 180, including indication of whether visual content 180 has been rejected or approved. Rejection notifications may include information descriptive of one or more reasons for which visual content 180 was rejected. Additionally, if visual content 180 has been rejected, visual content module 310 can return the visual content to content management subsystem 110 for correction and re-submission by the relevant content provider.

Status messages may be sent in any suitable manner, including visual content module 310 sending one or more e-mail messages to the content provider, or visual content module 310 communicating with content management subsystem 110, which sends one or more status messages to the relevant content provider.

If visual content 180 has been approved, visual content module 310 may cause the visual content to be deployed. In other words, visual content 180 is made available at content server subsystem 130 for delivery to client communication subsystem 160 by way of application server subsystem 150. Visual content module 310 can cause visual content 180 to be deployed by storing it to data store 320, which may include any suitable data storage technologies, including database and server technologies.

Delivery module 340 may be configured to query data store 320 for visual content 180 and to retrieve the identified visual content from data store 320. Retrieved visual content 180 may be cached by delivery module 340 for subsequent use, as will be understood by those skilled in the art. Queries of data store 320 may be based on data received from application server subsystem 150. As shown in FIG. 3, delivery module 340 can communicate with application server subsystem 150. Accordingly, application server subsystem 150 may submit a request for visual content 180 to delivery module 340, which may identify and retrieve the requested visual content. If available, the requested visual content may be retrieved from cache at delivery module 340. Otherwise, the requested visual content may be retrieved from data store 320.

Delivery module 340 may respond to a request for visual content 180 by providing retrieved visual content 180 to application server subsystem 150. In certain embodiments, visual content 180 can be requested by and delivered to application server subsystem 150 using an XML application program interface ("API") over HTTP, which will be understood by those skilled in the art.

Content server subsystem 130 may be configured to generate and maintain an index descriptive of associations between telephony attributes, deployed visual content 180, and other information associated with the visual content. For example, the index may include a list of telephone numbers and identifiers of the visual content associated with each of the telephone numbers. By way of another example, the index may include data representative of associations between visual content 180 and information such as area codes or zip codes. This allows system 100 to use a wide variety of telephony attributes and predefined associations to identify visual content 180 to be displayed in sync with the occurrence of specific telephony attributes. The predefined associations may also dictate the delivery of specific instances of visual content 180 based on geographic location.

For example, a particular content provider may wish to provide different instances of visual content 180 to callers based on the geographic locations of the callers. The content provider may define visual content associations to delineate the particular instances of visual content 180 to be delivered to specific geographic locations or regions. Any geographic identifier may be used to define the associations, including area codes or zip codes, for example. In this manner, content providers are able to tailor the delivery of visual content 180 based on any telephony attributes and/or information associated with telephony events and callers. For instance, a nationwide food service organization can define visual content associations so that particular visual depictions of menus or specials are delivered to callers within a specific geographic area. This feature is especially useful when the costs or availability of goods and services differ by geographic location.

The index may include any associations defined by content providers using content management subsystem 110. Any potentially useful information may be associated with visual content 180 in the index. For example, the index may include information comprising, but not limited to, telephony attributes, telephony signals (e.g., IVR or DTMF input), information associated with content providers, information associated with voice services subscribers, descriptions of visual content 180, visual content identifiers (e.g., web site and web page names), and any other information that may be useful for determining visual content 180 to be delivered.

The information included in index may be kept current (i.e., refreshed) by content server subsystem 130. For example, when visual content 180 deployed at content server subsystem 130 (e.g., deployed in data store 320 or as cached content at delivery module 340) is updated, content server subsystem 130 can recognize and propagate the update to the index.

Content server subsystem 130 may be configured to provide the index and index updates to application server subsystem 150. For example, each update of the index may trigger delivery of an up-to-date index from content server subsystem 130 to application server subsystem 150. Visual content module 310 may be configured to recognize updates to deployed visual content 180, update the index accordingly, and provide the updated index to delivery module 340. Delivery module 340 may be configured to transmit the index to application server subsystem 150 periodically, in response to a request from application server subsystem 150, or whenever the index is updated. Application server subsystem 150 or client communication subsystem 160 may use the index to identify visual content 180 to be requested, as described below.

C. Application Server Subsystem

Application server subsystem 150 may be configured to communicate with client communication subsystem 160 and content server subsystem 130. For example, application server subsystem 150 may receive requests from client communication subsystem 160, including requests for visual content 180. The requests may include visual content identifiers and/or other information (e.g., telephony attributes) useful for identifying visual content 180. Application server 150 may also receive requests from other sources over the communications network (e.g, from voice communication network 170). Application server subsystem 150 can forward requests for visual content 180 to content server subsystem 130, which may be configured to respond by providing the requested visual content to application server subsystem 150, as described above. Application server subsystem 150 may process (e.g., transform) and forward visual content 180 to client communication subsystem 160 to respond to the requests received from the client communication subsystem 160.

Figure 4:
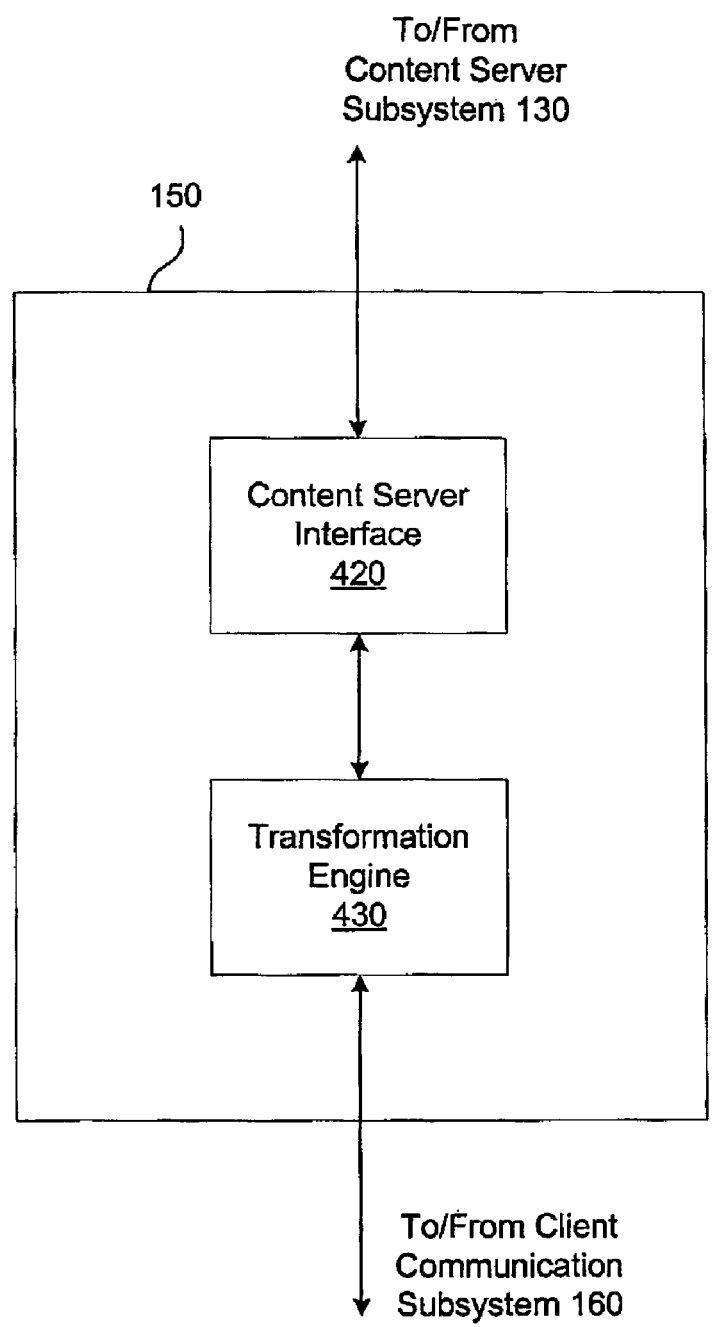
FIG. 4 is a block diagram illustrating a particular embodiment of the application server subsystem of FIG. 1.

FIG. 4 is a block diagram illustrating a particular embodiment of application server subsystem 150. As shown in FIG. 4, application server subsystem 150 may include content server interface 420 and transformation engine 430 communicatively coupled to one another as shown. Content server interface 420 may be configured to communicate with content server subsystem 130 to request and receive visual content 180. In certain embodiments, content server interface 420 communicates with delivery module 340 of content server subsystem 130 using XML/XLST over HTTP.

Transformation engine 430 may be configured to transform messages between first and second formats, including converting visual content 180 in a first format to visual content in a second format. The first format may be suitable for communications between application server subsystem 150 and content server subsystem 130, and the second format may be suitable for communications between application server subsystem 150 and client communication subsystem 160. In certain embodiments, for example, transformation engine 430 is configured to convert messages between XML and HTML formats to allow visual content 180 deployed in XML format to be transformed and transmitted to client communication subsystem 160 in HTML format. This allows standard browser applications operating on client communication subsystem 160 to display visual content 180.

Of course, system 100 is not limited to using particular data formats. Any suitable data formats and communication protocols may be used to collect and deliver visual content 180 upon detection of an occurrence of telephony attributes predefined as being associated with the visual content.

In certain embodiments, application server subsystem 150 is configured to forward the index described above from content server subsystem 130 to client communication subsystem 160. This enables client communication subsystem 160 to use associations included in the index to identify visual content 180 to be requested in response to detection of an occurrence of a predefined telephony attribute associated with a voice call. By identifying, at client communication subsystem 160, specific instances of visual content 180 to be requested, data traffic transmitted between client communication subsystem 160 and application server subsystem 150 can be reduced.

In other embodiments, however, it may be desirable to minimize processing at client server subsystem 160. In such embodiments, application server subsystem 150 may be configured to receive a request from client communication subsystem 160, use information included in the request (e.g., a telephone number) to query the index to identify specific instances of visual content 180, and send a request for the visual content to content server subsystem 130. Such configurations are especially useful in mobile communication environments or in other embodiments in which capacity may be limited at client communication subsystem 160.

In some embodiments, it may be desirable to control the delivery of visual content from network elements deployed in the voice communications network 170. For example, where the visual content is associated with an interactive voice response ("IVR") facility, it may be desirable for the IVR system to control delivery of visual content. Application server subsystem 150 may be configured to receive requests over the communications network from a remote source, such as a network element (e.g., an IVR system or control element) deployed as part of the voice communications network 170. Application server subsystem 150 may also be configured to use the information in the requests to identify specific instances of visual content 180, and send a request for the visual content to content server subsystem 130. Application server subsystem 150 may further be configured to provide the index to the remote source.

D. Client Communication Subsystem

Client communication subsystem 160 may include any device(s) and/or interface(s) capable of sending and/or receiving voice communications over voice communication network 170 (which may be accessible via access network 165). For example, client communication subsystem 160 may include, but is not limited to, one or more voice-enabled personal data assistants, mobile telephones (cellular telephones), satellite pagers, video phones, modems, IP phones, SIP phones, POTS phones, PSTN devices, computing devices operating softphones or other voice communication software, entertainment devices, gaming devices, and any other devices capable of sending and/or receiving voice communications (e.g., voice calls) over voice communication network 170. As used herein, the term "voice communications" is meant to be understood broadly as any communications that include voice signals. In certain embodiments, voice communications include voice calls associated with voice communication services provided over voice communication network 170. In a preferred embodiment, a voice signal of a voice communication is not the same as a data signal of a data communication transmitted by a modem.

Voice communication network 170 may include any network(s) capable of carrying voice communications between voice-enabled devices. Voice communication network 170 is typically configured to carry voice service communications between devices, including voice communications associated with PSTN services, mobile telephone services, and VoIP services, for example. Voice communication network 170 may employ any voice service communication technologies known to those skilled in the art.

Client communication subsystem 160 may include any device(s) and/or interfaces capable of requesting, receiving, and/or displaying visual content 180, including, for example, IP-enabled display devices, set-top boxes, modems, IP-enabled voice communication devices having display capabilities, and IP-capable video platforms (e.g., IP-capable televisions). Client communication subsystem 160 may include one or more devices having one or more visual display screens, as well as applications configured to instruct the device(s) to display visual content 180 on the screen(s). In certain embodiments, the applications are in the form of one or more web browsers, including any web browser known in the art.

In certain embodiments, client communication subsystem 160 includes a single device having voice communication, IP-based communication, and display capabilities. The device may be configured for voice communications over voice communication network 170, IP-based communications (e.g., HTTP) with application server subsystem 150 over a data network, and display capabilities for displaying visual content 180. The voice communications and IP-based communications may be over a single access network 165, for example, a DSL-enabled network, a DOCSIS-enabled network, or a passive optical network ("PON") with voice/data capabilities. The client communication device may comprise a Verizon One® phone provided by Verizon Communications, Inc. of New York, N.Y.

In certain other embodiments, client communication subsystem 160 includes one or more voice communication devices (e.g., telephones), IP-capable communication devices (e.g., set-top boxes), and IP-platform display devices (e.g., IP-platform televisions). For example, client communication subsystem 160 may include one or more set-top boxes and televisions configured to operate with video services such as fiber-optic video services (e.g., 'FiOS TV') provided by Verizon Communications, Inc. of New York, N.Y. The different devices may be communicatively coupled (e.g., by a local area network) so that display of visual content 180 can be synchronized with telephony signals.

Figure 5:
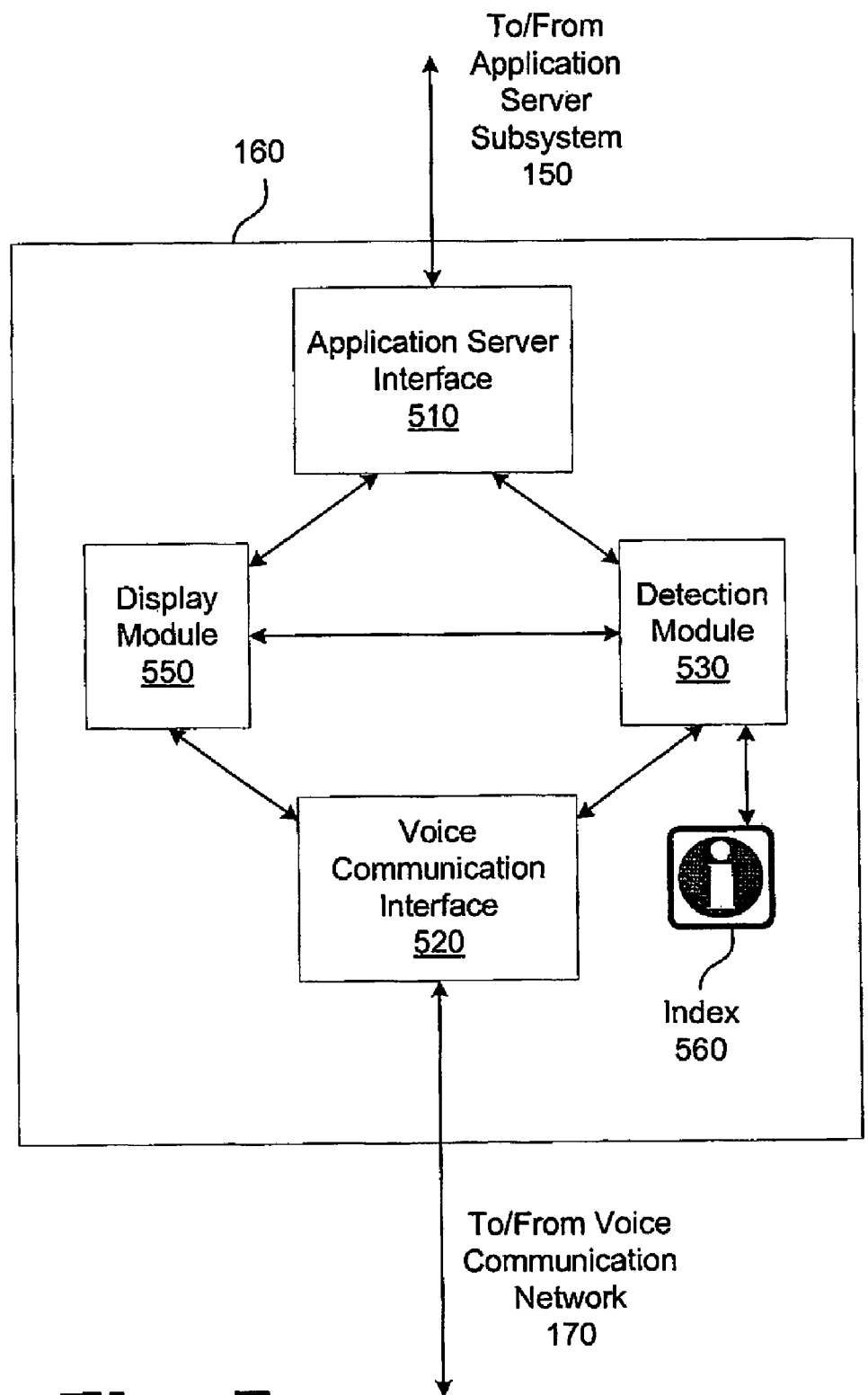
FIG. 5 is a block diagram illustrating a particular embodiment of the client communication subsystem of FIG. 1.

FIG. 5 is a block diagram illustrating a particular embodiment of client communication subsystem 160 of FIG. 1. As shown in FIG. 5, client communication subsystem 160 may include application server interface 510, voice communication interface 520, detection module 530, and display module 550 communicatively coupled to one another as shown. Any suitable communications technologies may be employed to communicatively couple the elements of FIG. 5.

Voice communication interface 520 may be configured to act as a communication interface with voice communication network 170. Voice communication interface 520 may employ any technologies and/or devices for interfacing with voice communication network 170, including technologies known in the art.

Voice communication interface 520 may be further configured to provide a user interface to voice communication services provided over voice communication network 170. For example, voice communication interface 520 may include any user-interface technologies employed by known telephony devices, including microphones, speakers, keypads, and other input and output devices and interfaces. Accordingly, voice communication signals between voice communication network 170 and a user of client communication subsystem 160 pass through and can be detected at voice communication interface 520.

Detection module 530 may be configured to detect any voice communication signals passing through voice communication interface 520. For example, detection module 530 can recognize signals representative of telephony attributes (e.g., telephony identifiers or events), including, but not limited to, a telephone number dialed by a user of client communication subsystem 160, a touchtone signal (i.e., a DTMF signal), and an IVR signal.

Detection module 530 may use the recognized telephony attributes to identify visual content 180 that has been predefined as being associated with the telephony attributes. For example, detection module 530 may query index 560 for a telephony attribute (e.g, a telephone number) and use information included in index 560 to identify visual content 180 associated with the telephony attribute. More specifically, detection module 530 may identify a visual content identifier included in index 560, which identifier is useful for requesting delivery of specific instances of visual content 180 to client communication subsystem 160

Index 560 may include any of the information described above in relation to the index maintained at content server subsystem 130. Index 560 may be stored in any suitable data store (e.g., a local cache) at client communication subsystem 160. As noted above, index 560 may alternately be implemented at application server subsystem 150.

Detection module 530 may use information included in index 560 to form a request for the identified visual content 180. The request may include any suitable identifier of the visual content, including, for example, a network address (e.g., a Uniform Resource Locator ("URL")). Detection module 530 can send the request to application server subsystem 150 by way of application server interface 510, which can function as an interface to application server subsystem 150, as described below.

In addition to visual content identifiers, index 560 may include at least a subset of visual content 180. For example, index 560 may include predetermined introductory visual content pages associated with content providers. A designated introductory page may be displayed at client communication subsystem 160 while additional instances of visual content 180 is being retrieved from content server subsystem 130. By way of example, when a user of client communication subsystem 160 dials a target telephone number, detection module 530 may determine whether index 560 includes visual content 180 associated with the target telephone number. If such visual content 180 is included in index 560, detection module 530 may provide the visual content to display module 550, which will cause the visual content to be displayed at client communication subsystem 160 while additional visual content 180 (i.e., visual content associated with a visual content identifier included in index 560) is being requested and retrieved from content server subsystem 130.

Accordingly, content providers may select visual content 180 such as an introductory page that will be displayed to users of client communication subsystem 160 virtually immediately upon recognition of telephony signals representative of predefined telephony attributes. Introductory pages or other selected instances of visual content 180 may attract the attention of users while additional visual content 180 is being retrieved.

Application server interface 510 may be configured to act as a communication interface with application server subsystem 150. Application server interface 510 may include any device(s) and application(s) useful for interfacing communications, including modems and network interface cards, for example. In many embodiments, communications between application server subsystem 150 and client communication subsystem 160 are IP-based (e.g., XML/XSLT over HTTP). For instance, application server subsystem 150 and client communication subsystem 160 may communicate with one another over a data network via the access network 165 (e.g., a wide area network such as the Internet).

As mentioned previously, requests may be sent from client communication subsystem 160 to application server subsystem 150 through application server interface 510. In addition, responses to the requests may be received through application server interface 510, including responses in the form of visual content 180. Visual content 180 may be received in the form of HTML messages.

The received visual content 180 may be forwarded to display module 550, which is configured to display visual content 180 for consideration by a user of client communication subsystem 160. Display module 550 may include any suitable technologies for displaying visual content 180, including, for example, one or more display devices and applications (e.g., standard web browsers). Display module 550 may be configured to receive and recognize touch-screen input from a user of client communication subsystem 160.

In this above-described manner, system 100 is able to provide specific instances of visual content 180 for display, the visual content being provided in response to detection of predefined telephony signals. Accordingly, client communication subsystem 160 can receive both voice signals associated with a voice call and visual content 180 identified as being associated with a telephony attribute associate with the voice call. Voice signals and visual content 180 may be received substantially simultaneously at client communication subsystem 160. This allows a user of client communication subsystem 160 to be presented with both visual content 180 and voice signals in a manner that allows her to efficiently consider both types of content at virtually the same time.

The display of visual content 180 at client communication subsystem 160 can be synchronized with telephony signals representative of predefined telephony attributes. In certain embodiments, the display of visual content may be synchronized with playback of voice signals at client communication subsystem 160. Synchronized delivery of visual content 180 and voice signals to voice call participants expands the amount, quality, and presentation of information to the call participants, especially initiators of voice calls to telephone numbers associated with content providers. Moreover, content providers enjoy expanded options for building and presenting content to voice call participants. Visual voice calls provide a useful and convenient way to provide information and services to users of voice communication services.

III. Visual Content

Visual content 180 may include any data representative of information (e.g., images and text) capable of being displayed, or transformed and displayed, at client communication subsystem 160. In certain embodiments, for example, visual content 180 includes one or more visual content pages (e.g., web pages). The visual content pages may be organized hierarchically into groups (e.g., web sites), which groups may be associated with particular content providers. Visual content pages and sites can be assigned identifiers (e.g., URL addresses) useful for identifying and accessing the pages and sites.

By way of an example, a particular content provider may build a web site including one or more web pages, assign identifiers to the site and/or pages, and associate the site and/or pages with telephony attributes. A detected occurrence of telephony signals representative of one of the telephony attributes will trigger delivery and display of the corresponding visual content page.

Visual content 180 may be stored at content server subsystem 130 in XML format. In certain embodiments, visual content 180 includes at least two classes of XML streams, including a class configured to capture global components of a visual content site, the number of visual content pages to be included in the site, and a page (e.g., an introductory page) designated to be displayed first in response to recognition of the occurrence of predefined telephony attributes. The second XML stream may be associated with each visual content page in the visual content site. An exemplary XML site stream is provided in Table 1, and an exemplary XML page stream is provided in Table 2. Of course, in alternative embodiments, suitable data formats other than XML may be used to represent visual content 180.

TABLE 1

Exemplary XML Site Stream

```
<Site_XML>
    <Customer>ABC Pizza</Customer>
    <DefBkImage>//myserver/images/gk.gif</DefBkImage>
    <DefHeader>20</DefHeader>
    <StartPageId>2001</StartPageId>
    <Pages>
        <Page PageId=20001>
            <Name>MainPage</Name>
            <Title>Welcome to ABC Pizza</Title>
        </Page>
        <Page PageId=20002>
            <Name>FoodMenu</Name>
            <Title>Menu</Title>
        </Page>
        <Page PageId=20003>
            <Name>AppetizerMenu</Name>
            <Title>Appetizers</Title>
        </Page>
        <Page PageId=20004>
            <Name>LunchMenu</Name>
            <Title>Lunch Entree</Title>
        </Page>
        <Page PageId=20005>
            <Name>DessertMenu</Name>
            <Title>Desserts</Title>
        </Page>
        <Page PageId=20006>
            <Name>Location</Name>
            <Title>Location</Title>
        </Page>
    </Pages>
    <BinaryImages>
        <BinaryImage>
            <Name> DefBkImage</Name>
            <BinImage>...... </BinImage>
        </BinaryImage>
    </BinaryImages>
</Site_XML>
```

TABLE 2

Exemplary XML Page Stream

```
<Page_XML>
    <PageId>2001</PageId>
    <PageName>FoodMenu</PageName>
```

TABLE 2-continued

Exemplary XML Page Stream

```
    <BkImage>Default</BkImage>
    <Header>20</Header>
    <MainContent>
        <HTMLContent></HTMLContent>
    </MainContent>
        <BinaryImages>
            <BinaryImage>
                <Name> #Img_Appetizer</Name>
                <BinImage>...... </BinImage>
            </BinaryImage>
            <BinaryImage>
                <Name> #Img_Lunch</Name>
                <BinImage>...... </BinImage>
            </BinaryImage>
            <BinaryImage>
                <Name> #Img_Dessert</Name>
                <BinImage>...... </BinImage>
            </BinaryImage>
        </BinaryImages>
        <HrefPages>
            <HrefPage>
                <Name> #href_Appetizer</Name>
                <PageId>20003</PageId>
            </HrefPage>
            <HrefPage>
                <Name> #href_Lunch</Name>
                <PageId>20004</PageId>
            </HrefPage>
            <HrefPage>
                <Name> #href_Dessert</Name>
                <PageId>20004</PageId>
            </HrefPage>
        </HrefPages>
</Page_XML>
```

The exemplary XML streams shown in Table 1 and Table 2 are representative of visual content 180 that may be associated with a content provider ("ABC Pizza") in the food service industry. As shown in Table 1 and Table 2, XML visual content streams may include information defining visual content site identifiers, associated content providers, background images, headers, introductory pages, visual content pages, visual content page identifiers, and page contents, including image identifiers.

As introduced above, visual content 180 may include different classifications of content, including, but not limited to, static, dynamic, and interactive. Static visual content refers to content configured simply for display at client communication subsystem 160. Static content may include any information capable of being displayed visually, including, for example, information about content providers and/or information descriptive of products and services being offered. Examples of static visual content may include food menus, advertisements, coupons, addresses, driving directions, maps, and any other information configured to be visually displayed in a static fashion.

Dynamic visual content may include any content that is updated in near real time or that changes visual appearance during display. Content providers may elect to share content dynamically with system 100.

Interactive visual content may include any content configured to elicit and accept user input. For example, interactive visual content may include data entry fields and selectable menu options. Interactive visual content allows voice call participants to use the visual content to provide input, including making selections by touching menu options displayed on a display screen at client communication subsystem 160. This feature may be referred to as interactive visual response, which functions similarly to interactive voice response, except that user input may be received through touch-screen selections instead of or in addition to input being received through voice responses. Interactive visual content allows call participants to quickly and conveniently navigate through menu options associated with a voice call, without having to wait for menu options to be audibly recited.

Presentation of visual content 180 may be synchronized with existing automated telephone applications (e.g., interactive voice response applications and automated operators) to enhance user experiences with the automated telephony applications. For example, menu choices may be visually displayed while an automated operator audibly recites the same menu choices.

Visual content 180 may also include different categories of content. Exemplary categories may include, but are not limited to, industry-specific categories (e.g., food services, financial, travel, lodging, retail, telecommunications, information technology, customer service, and healthcare industries). Categorization of visual content 180 may be useful for determining the visual content to be delivered in certain situations and in accordance with predefined preferences of users of client communication subsystem 160.

Visual content 180 may also include any information related to content providers of visual content 180, including any information defined by content providers as being associated with visual content 180.

System 100 provides users of voice communication services with combined visual and voice communication services. Visual content 180 can be displayed synchronously with the occurrence of predefined telephony attributes, as described above. For example, a user of client communication subsystem 160 may initiate a voice call to a telephone number associated with a local restaurant. When the user dials the telephone number, client communication subsystem 160 may recognize the occurrence of telephony signals representative of the telephone number. Visual content 180 predefined as being associated with the telephone number is then identified and displayed to the user. The visual content 180 may include a menu of food services and products offered by the local restaurant. Accordingly, the caller does not have to wait for a human operator to audibly describe the menu. Moreover, the visual content 180 may include images helpful for making a selection from the menu.

Other content providers may similarly associate visual content 180 with telephone numbers so that callers are presented with visual information about the products and services offered by the content providers. For example, a banking institution may define visual content 180 to be displayed to callers. The visual content 180 may enable callers to conveniently and interactively use the services provided by the banking institution.

In addition to the above, elements within the voice communication network 170 may recognize the occurrence of a telephony attribute, and send a request to system 100 to provide a particular item of visual content 180. For example, a network element within voice communication network 170 may detect a call attempt to a telephone number associated with a content provider. The network element may then make a request to system 100 (e.g., to application server subsystem 150 as shown in FIG. 1) to provide visual content 180. Likewise, an IVR system within the voice communication network may detect a telephony event (e.g., a DTMF tone), and may then make a request to system 100 to provide visual content 180. The request may include an identifier for the calling party (e.g., a telephone number), which may be used to determine the destination client communication subsystem 160 for the visual content 180 (if the identifier is not a network address, a database mapping identifiers to network addresses may be used).

IV. Exemplary Process Views

Figure 6:
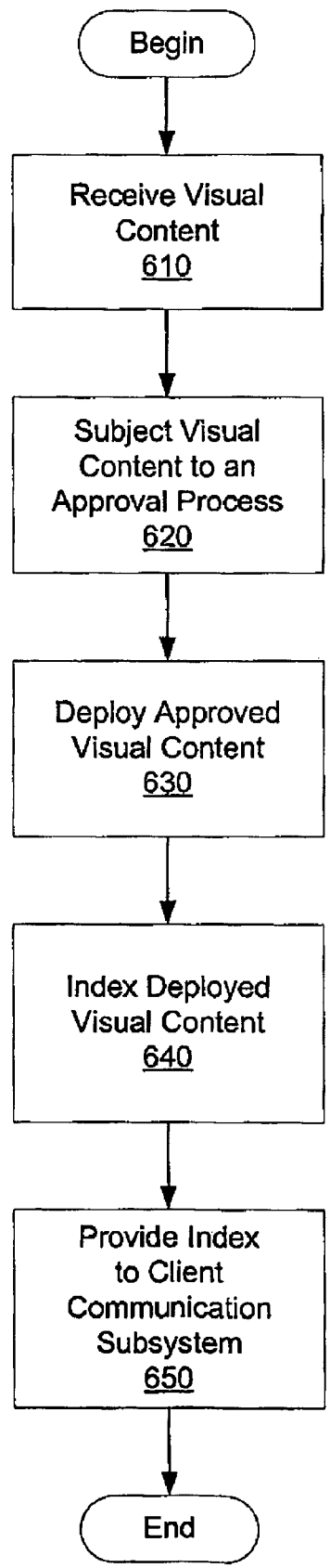
FIG. 6 is a flowchart illustrating an exemplary process for collecting visual content and associated telephony identifiers, according to an embodiment.

FIG. 6 is a flowchart illustrating an exemplary process for collecting visual content (e.g., visual content 180) and associated telephony attributes, according to an embodiment. While FIG. 6 illustrates exemplary steps according to one embodiment, other embodiments may omit, add to, and/or modify any of the steps shown in FIG. 6.

In step 610, visual content is received. This step may include content management subsystem 110 receiving visual content from a content provider, as described above. Step 610 may include receiving one or more telephone attributes defined by the content provider as being associated with the visual content. The telephony attributes may include any of the information described above, including telephone numbers, for example.

In step 620, the received visual content is subjected to an approval process. This step may be performed in any of the ways described above.

In step 630, approved visual content is deployed. This step may be performed in any of the ways described above, including visual content module 310 storing approved visual content to data store 320 at content server subsystem 130.

In step 640, deployed visual content is indexed. This step may include visual call module 310 creating or updating an index (e.g., index 560) with data representative of visual content, including, for example, visual content identifiers and telephony attributes predefined as being associated with the visual content.

In step 650, the index is provided to client communication subsystem 160. This step may be performed in any of the ways described above, including pushing the index to client communication subsystem 160 periodically, in response to a request, or whenever the index is updated. In alternative embodiments of the method of FIG. 6, step 650 may be modified to provide the index to application server subsystem 150, which may use the index to perform server-side identifications of visual content that is associated with telephony attributes.

The method illustrated in FIG. 6 provides content providers with a way to create and manage visual content, including defining associations that specify telephony attributes or other information that will trigger delivery and display of visual content to a voice call participant. Accordingly, content providers can define synchronization of visual content with telephony signals.

Figure 7:
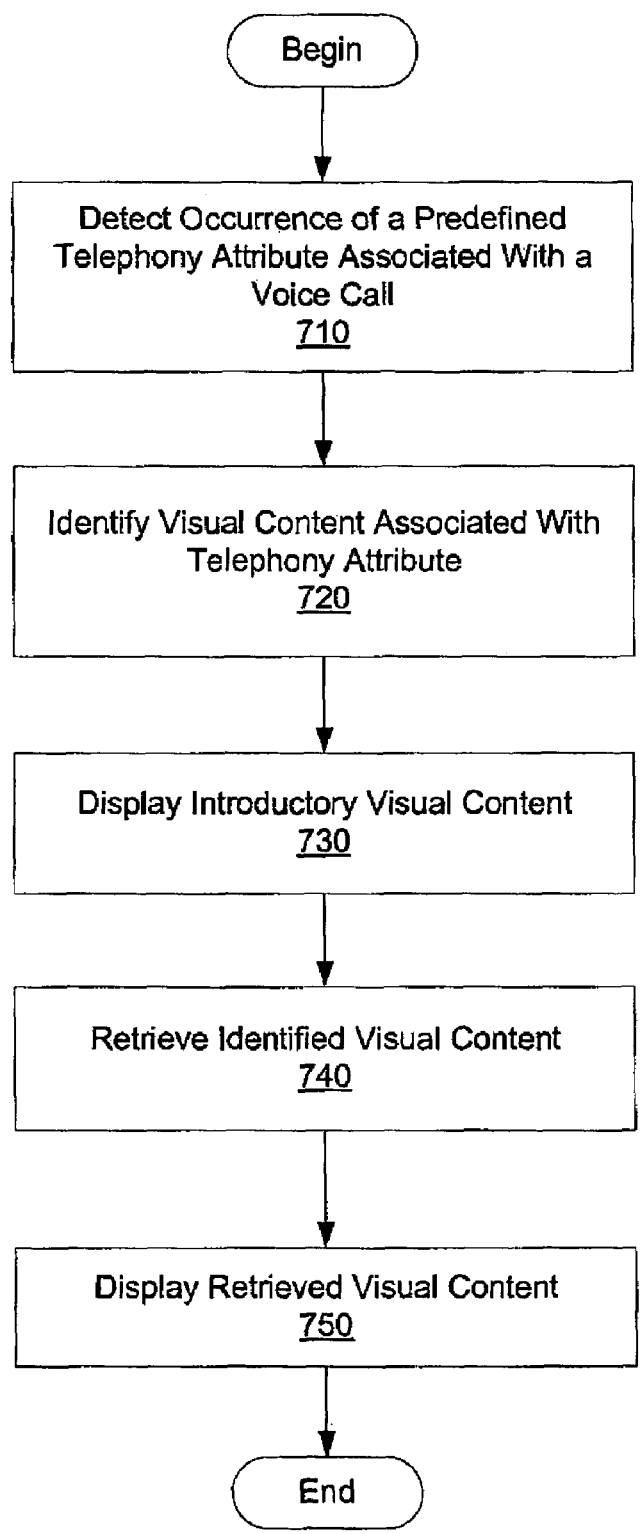
FIG. 7 is a flowchart illustrating an exemplary process for providing visual content in response to recognition of an occurrence of predefined telephony signals, according to an embodiment.

Once the steps of FIG. 6 have been performed, visual content is ready to be delivered to client communication subsystem 160 when occurrences of telephony signals indicative of visual voice calls are detected. FIG. 7 is a flowchart illustrating an exemplary process for providing visual content in response to recognition of an occurrence of a predefined telephony signal indicative of a visual voice call, according to an embodiment. While FIG. 7 illustrates exemplary steps according to one embodiment, other embodiments may omit, add to, and/or modify any of the steps shown in FIG. 7.

In step 710, an occurrence of a predefined telephony attribute associated with voice call is detected. Step 710 may be performed in any of the ways described above, including detecting telephony signals (e.g., DTMF signals) at client communication subsystem 160 or within voice communication network 170. Predefined telephony attributes may include any of the information described above, including a voice network identifier and initiation of a voice call, for example.

In step 720, visual content predefined as being associated with the detected telephony signals representative of a telephony attribute is identified. Step 720 may be performed in any of the ways described above, including querying an index (e.g., index 560) stored at client communication subsystem 160, application server subsystem 150 or voice communication network 170 for the telephony attribute and identifying visual content associated with the telephony attribute.

In step 730, introductory visual content is caused to be displayed for consideration by a voice call participant. Step 730 may be performed in any of the ways described above, including pulling introductory visual content from index 560 and displaying the introductory visual content at client communication subsystem 160.

In step 740, the visual content identified in step 720 is retrieved. Step 740 may be performed in any of the ways described above, including client communication subsystem 160 or elements within voice communication network 170 requesting the visual content from application server subsystem 150 be provided to client communication system 160, which in turn requests the visual content from content server subsystem 130.

In step 750, the retrieved visual content is displayed for consideration by a call participant. Step 750 may be performed in any of the ways described above, including displaying the visual content at client communication subsystem 160.

The method illustrated in FIG. 7 delivers and displays visual content synchronously with the occurrence of a predefined telephony attribute. Accordingly, call participants can receive visual content and audio content associated with voice calls. Visual voice calls can provide substantial information and options to call participants in a convenient and useful fashion. In many cases, voice call participants can use the visual information to quickly and conveniently consider information and make selections.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A method comprising:
   detecting at least one telephony attribute associated with a voice call directed from a client communication subsystem to a voice network identifier;
   identifying visual content that has been predefined as being associated with the at least one telephony attribute;
   initiating a request for the visual content in response to said detecting step; and
   receiving the visual content in response to said initiating step, the visual content being received for display at the client communication subsystem.

2. The method of claim 1, further comprising receiving at least one voice signal associated with the voice call, said step of receiving the visual content and said step of receiving the at least one voice signal being performed substantially simultaneously at the client communication subsystem.

3. The method of claim 1, further comprising:
   receiving, at the client communication subsystem, at least one voice signal associated with the voice call;
   playing back the voice signal at the client communication subsystem; and
   displaying the visual content at the client communication subsystem, said displaying step being synchronized with said playing back step.

4. The method of claim 1, further comprising receiving, from a content provider, visual content and a predefined association of the visual content to the at least one telephony attribute, said identifying step including using the predefined association to identify the visual content as being associated with the at least one telephony attribute.

5. The method of claim 4, further comprising:
   generating an index, the index including the predefined association; and
   delivering the index to the client communication subsystem, wherein the using step is performed at the client communication subsystem.

6. The method of claim 4, further comprising:
   generating an index, the index including the predefined association; and
   delivering the index to an application server subsystem, wherein the using step is performed at the application server subsystem.

7. The method of claim 1, wherein said detecting step includes recognizing a dialing, at the client communication subsystem, of the voice network identifier, wherein the at least one telephony attribute comprises at least a portion of the voice network identifier.

8. The method of claim 1, wherein said detecting step includes recognizing a voice or touchtone signal initiated at the client communication subsystem, the at least one telephony attribute comprising data representative of the predefined voice or touchtone signal.

9. The method of claim 1, further comprising:
   storing an introductory visual content page at client communication subsystem, the introductory visual content page being predefined as being associated with the voice network identifier; and
   displaying the introductory visual content page at client communication subsystem in response to said detecting step.

10. The method of claim 1, further comprising providing content management templates to the content provider, the content templates including a tool for defining the predefined association of the visual content to the at least one telephony attribute.

11. The method of claim 1, further comprising providing a library of images to the content provider, the images in the library being configured for use in building the visual content.

12. A method comprising
   receiving, from a content provider, visual content and a predefined association of the visual content to a telephone number;
   storing the visual content at a content server subsystem;
   detecting an initiation of a voice call from a client communication subsystem to the telephone number;
   using the predefined association to identify the visual content as being associated with the telephone number; and
   delivering the visual content from the content server subsystem to the client communication device for display.

13. A system comprising:
a content management subsystem configured to receive, from a content provider, visual content and a predefined association of said visual content to at least one telephony attribute;
a content server subsystem communicatively coupled to said content management subsystem and configured to store said visual content and said predefined association of said visual content to said at least one telephony attribute, said content server subsystem being further configured to
receive a request for said visual content, the request being initiated in response to a detection of said at least one telephony attribute occurring in association with a voice call directed from a client communication subsystem to a voice network identifier associated with the content provider, and
respond to the request by delivering said visual content to the client communication subsystem for display.

14. The system of claim 13, wherein said at least one telephony attribute includes at least one of an initiation, connection, disconnection, and termination of the voice call directed from the client communication subsystem to the voice network identifier associated with the content provider.

15. The system of claim 13, wherein said at least one telephony attribute includes at least one of an interactive voice response ("IVR") signal or a touchtone signal directed from the client communication device to the voice network identifier associated with the content provider.

16. The system of claim 13, wherein said voice network identifier includes a telephone number associated with the content provider, and said at least one telephony attribute includes a dialing, at the client communication subsystem, of the telephone number associated with the content provider.

17. The system of claim 13, wherein the client communication subsystem is configured to:
receive at least one voice signal associated with the voice call;
play back said the voice signal; and
display said visual content, the display of said visual content being synchronized with the playback of said voice signal.

18. The system of claim 13, further comprising an index stored at the client communication subsystem, said index including said predefined association of said visual content to said at least one telephony attribute, the client communication subsystem being configured to query said index for said at least one telephony attribute and to identify said visual content associated with said at least one telephony attribute.

19. The system of claim 18, wherein said index includes an introductory visual content page configured to be displayed at the client communication subsystem while said visual content is being retrieved from said content server subsystem.

20. The system of claim 13, further comprising
an application server subsystem communicatively coupling the client communication subsystem to said content server subsystem; and
an index stored at said application server subsystem, said index including said predefined association of said visual content to said at least one telephony attribute, said application server subsystem being configured to query said index for said at least one telephony attribute and to identify said visual content associated with said at least one telephony attribute.

21. The system of claim 13, wherein the client communication device comprises a single telephony device configured to send and receive voice communications over a voice communication network and to display said visual content.

22. The system of claim 13, wherein said predefined association further defines at least one association between said visual content and a geographic identifier, said visual content being requested for delivery when it is determined that said geographic identifier matches a geographic location associated with the client communication subsystem.

23. The system of claim 13, wherein said content management subsystem is configured to provide one or more predefined templates to the content provider, said predefined templates including one or more tools for managing visual content.

24. The system of claim 13, wherein said content management subsystem is configured to provide a library of images to the content provider, said library of images including images configured for use in building said visual content.

* * * * *